3 Sheets—Sheet 1.

T. J. MAYALL.

Assignor to F. B. Williams.

APPARATUS FOR DELIVERING SHEETS FROM PRINTING PRESSES.

No. 7,786. Reissued July 3, 1877.

Witnesses:
Ewell & Sick
J. H. Carpenter.

Inventor:
Thomas J. Mayall by
Pollok & Bailey his
attys.

3 Sheets—Sheet 2.

T. J. MAYALL.

Assignor to F. B. Williams.

APPARATUS FOR DELIVERING SHEETS FROM PRINTING PRESSES.

No. 7,786. Reissued July 3, 1877.

Witnesses:
Ewell & Sick
J. E. Carpenter.

Inventor
Thomas J. Mayall by
Pollok & Bailey
his attys.

3 Sheets—Sheet 3.

T. J. MAYALL.

Assignor to F. B. Williams.

APPARATUS FOR DELIVERING SHEETS FROM PRINTING PRESSES.

No. 7,786. Reissued July 3, 1877.

Witnesses:
Ewell A. Dick
J. Carpenter.

Inventor:
Thomas J. Mayall
by Pollok & Bailey
his attorneys.

UNITED STATES PATENT OFFICE.

THOMAS J. MAYALL, OF READING, MASSACHUSETTS, ASSIGNOR, BY MESNE ASSIGNMENTS, TO FRANK B. WILLIAMS.

IMPROVEMENT IN APPARATUS FOR DELIVERING SHEETS FROM PRINTING-PRESSES.

Specification forming part of Letters Patent No. 146,985, dated December 30, 1873; reissue No. 7,786, dated July 3, 1877; application filed March 6, 1877.

*To all whom it may concern:*

Be it known that I, THOMAS J. MAYALL, formerly of Boston, Massachusetts, now of Reading, in the county of Middlesex and State of Massachusetts, have invented certain new and useful Improvements in Apparatus for Delivering Sheets from Printing-Presses, of which the following is a specification:

My improvements relate to that portion of a printing-press termed the "delivery"—the apparatus which receives the printed sheets as they issue from the press. My invention has been designed with special reference to use with "perfecting-presses," and particularly a perfecting-press for various other portions of which I have received Letters Patent No. 150,593, dated May 5, 1874, and No. 150,874, dated May 12, 1874.

Figure 1:
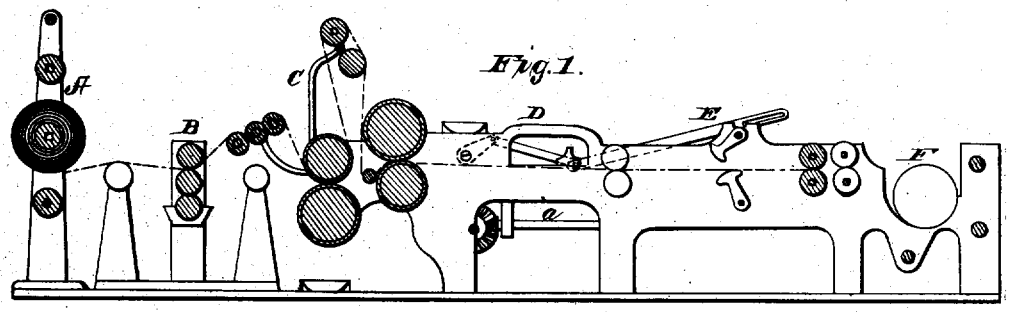

Figure 1 of the accompanying drawings is a diagram, partly in elevation and partly in section, of my press as a whole, indicating the position occupied by the delivery with relation to other parts of the press.

A is the paper-rack; B, the dampener; C, the printing apparatus; D, a perforator; E, nippers for tearing the paper into sheets, following the lines of perforations made by the perforator D; and F, the delivery. The sheets, torn or jerked apart by the nippers, are fed along between tapes and rolls until they pass to and are received by the delivery.

My improved delivery is designed to collect as many sheets together as may be desired from time to time, and then drop and run off the lot thus collected. The apparatus will count and register, so as to deliver the paper in lots of any number desired. By a very simple arrangement the pressman or attendant can alter each time the number of papers delivered to suit the circumstances of the case.

Figs. 2, 3, 4, 5, 6, and 7 represent the apparatus in which my improvements are embodied.

In these like letters indicate corresponding parts.

Figure 2:
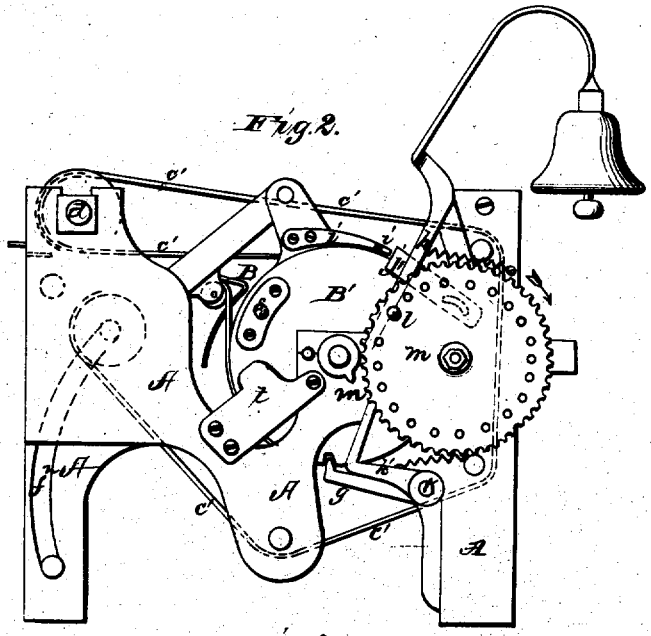
Figure 3:
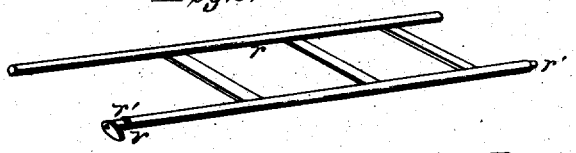
Figure 4:
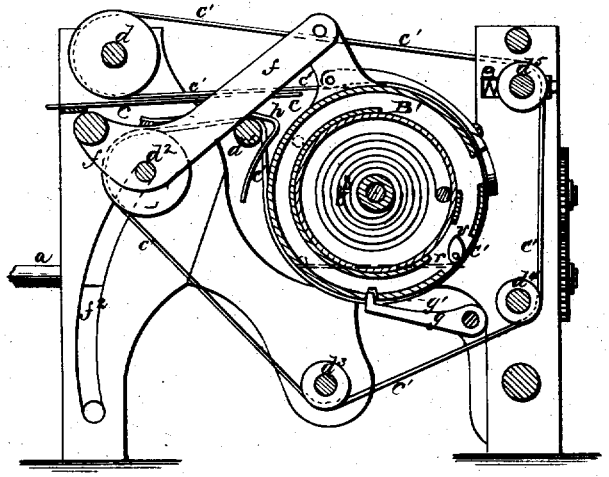
Figure 5:
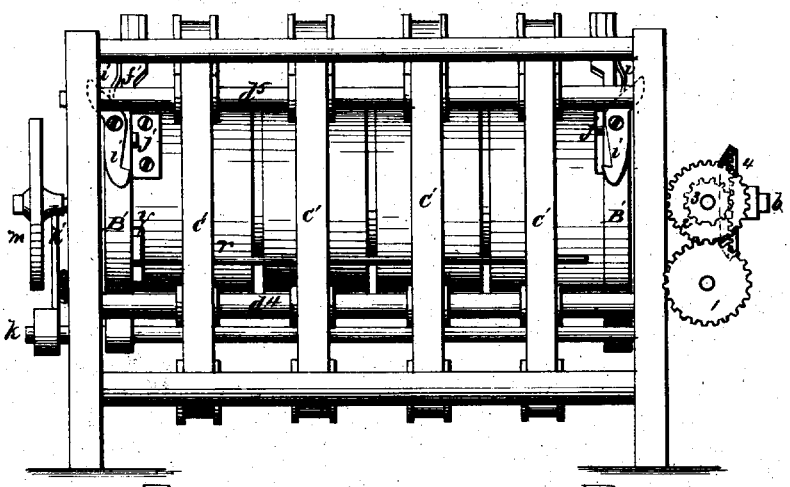
Figure 6:
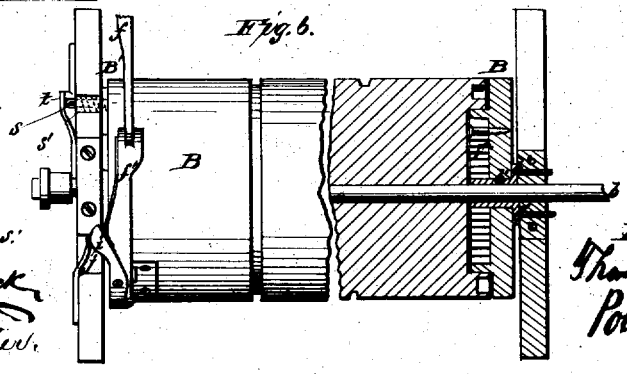
Figure 7:
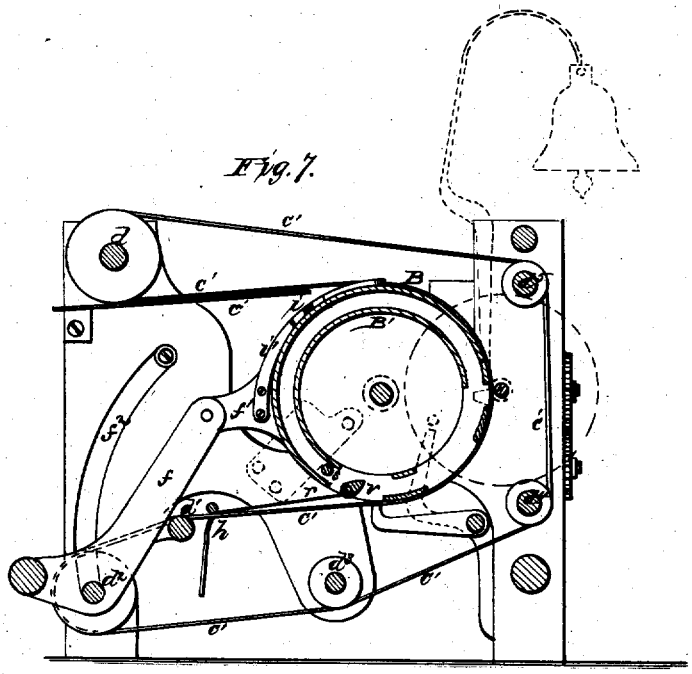

Fig. 2 is a side elevation. Fig. 3 is a detached view of the hinged guide or dropper, which is combined with the delivery-cylinder in the manner hereinafter described. Fig. 4 is a longitudinal vertical section in the plane of one of the heads of the delivery-cylinder, representing the delivery-apron raised. Fig. 5 is a rear elevation. Fig. 6 is a top view, partly in horizontal section, of the delivery-cylinder. Fig. 7 is a section similar to that in Fig. 4, with the delivery-apron dropped.

The various parts of the apparatus are supported in a frame, A. The delivery-cylinder B is revolved positively in the direction of the arrow in Fig. 2 by suitable means, which, in this instance, consists of a long shaft, *a*, (see Figs. 1 and 4,) deriving its rotary movement from the gearing on the printing apparatus, and imparting it to the shaft *b* of the cylinder through the medium of gears 1 2 3, the latter engaging a gear-wheel, 4, on the cylinder-shaft. The size of the cylinder around its periphery is slightly greater than the length of one of the sheets which pass around it, and its speed is so regulated that it takes one sheet at each revolution. The cylinder is provided with loose heads B′ B′, which are mounted and capable of rotating on tubular hubs *b′*, which encircle the ends of the cylinder-shaft, and are made fast to the frame A. At the front of the frame are long metallic fingers or guides *c* secured to the frame, extending nearly to the cylinder, and on a level with its top. Above these guides pass the endless carrier-tapes *c′*, which are arranged as follows: The tapes pass under pulleys on a shaft, *d*, above the stationary guides, and abreast of the front of the apparatus; thence over and down behind the cylinder; thence under the cylinder and over a binding-roller, $d^1$, which, in its normal position, is located as shown in Fig. 2; thence to the front over pulleys on a shaft, $d^2$; thence down and under pulleys on shaft $d^3$; thence to the rear and under pulleys on shaft $d^4$; thence up and over pulleys on shaft $d^5$, and thence back to shaft *d*, the starting-point. Three, four, or more endless tapes parallel with one another may be employed. They are caused to move with the cylinder by binding on the same. In order to accommodate the gradually-increasing number of papers wrapped on the cylinder, the tapes can be made of an elastic and extensible material, or the boxes of some of the pulley-shafts may be made to yield in the required direction, as shown in case of shaft $d^5$, whose boxes have in front of them springs *e*. Shafts $d^1$ and $d^2$ are hung on a frame or arms, $f$, which are jointed at their rear ends to rigid arms $f^1$ projecting from the periphery of the cylinder-heads B′, and at their front ends are guided in segmental or curved slots $f^2$ in frame A. For this purpose the ends of shaft $d^2$ project into these slots. When the cylinder-heads are turned so as to occupy the position shown in Figs. 2 and 4 the frame $f$ is raised and the tapes are held against the under side and front of the cylinder, thus compelling the papers on the cylinder to embrace and revolve with it; but when the cylinder-heads are partially rotated toward the front of the machine, so as to lower the frame $f$, the tapes drop from the under side and front of the cylinder, thus permitting the papers to fall away from the cylinder, and to be discharged out over the tapes from the front of the machine. I thus provide a dropping-apron, which can be kept raised to accumulate on the cylinder any desired number of papers, and then dropped to discharge the papers thus accumulated. The movement of the cylinder-head to drop the frame is effected by coiled wound-up springs $f^3$, one in each head, secured at one end to the stationary hub $b'$, and at the other end to the cylinder-head. The cylinder-heads are made hollow to receive these springs, and the latter tend to force the head in the direction requisite to effect the dropping of the apron. The heads are held in place in the position indicated in Figs. 2 and 4 by hooks $g$, which catch in notches $g'$ on the cylinder-heads. If these hooks are withdrawn the springs will immediately cause the apron to drop. Just above shaft $d^1$ are bent guide-fingers $h$ attached to the movable apron-frame, and shaped and located so as to keep the sheets of paper against the cylinder in the interval on the cylinder between the front tapes and the upper stationary guide-fingers when the apron is raised.

In order to again raise the apron after it has been dropped, I employ pivoted dogs $i$ on the cylinder-heads, which are pressed inward by springs $i'$, so as to lie in the path of lugs $j$ on the periphery of the cylinder. The revolution of the latter brings the lugs in contact with the dogs, so that the two engage, and the cylinder-heads are thus caused to rotate in a direction to raise the apron. By the time this has been accomplished the tails of the dogs will have been brought against wipers $j'$ on the frame A, which tilt the dogs so as to release them from the lugs. The notches $g'$ and the vibrating hooks $g$, which are pressed up against the cylinder-heads with a spring-pressure, are so located with relation to each other and the dogs and lugs that at the moment the latter are disengaging the hooks catch in the notches and hold the cylinder-heads fast.

In order to automatically drop the apron at any desired time, I secure the hooks $g$ on a rock-shaft, $k$, to which is also fastened, at one end, a bent tripping-lever, $k'$, the free end of which is arranged in the path of a pin, $l$, inserted in any one of a series of holes formed in a toothed register-wheel, $m$, having any desired number of teeth on its periphery—fifty or one hundred, or more—and mounted on the side of frame A. The wheel is so located that one of its teeth will be struck by a wiper-stud, $m'$, on the cylinder-shaft, which will move the wheel a distance of one tooth at each revolution of the cylinder. As one paper is wrapped on the cylinder at each revolution, then each tooth of the register-wheel will represent a paper; so that, by setting the pin $l$ in a hole distant, say, twenty-five or fifty, or more, teeth from the end of the tripping-lever, a corresponding number of papers will be accumulated on the cylinder before the pin strikes and depresses the lever so as to throw the hooks out from the notches in the cylinder-heads, which is, of course, at once followed by the dropping of the apron, and the consequent discharge of the sheets from the cylinder. The lugs and dogs for raising the apron are so located that the upward movement of the apron does not commence before the papers are discharged. Owing to the projecting arms $f^1$ on the cylinder-heads moving in the arc of a greater circle than the cylinder, the movement of the apron in rising is quicker than the travel of the paper on the cylinder, so that the sheet which enters the apparatus and follows after the discharged sheets will not have passed around to the front of the cylinder before the apron is again up in place. The registering-wheel may be "speeded down" by means of intermediate gearing, as in gas-registering meters, so that one tooth will represent five, ten, or more sheets.

To notify the attendant when the apron is about to drop, I make use of a lever, $p$, pivoted to the frame A, whose longer arm is so located as to be wiped by the pin $l$ a little before the latter reaches the tripping-lever. On the other arm of the lever is a bell, attached to the lever by a spring; and the movement of the lever thus induced causes the bell to ring, giving the alarm to the attendant, and notifying him to be in readiness to receive the batch of papers about to be dropped by the apron.

To prevent the sheets from possibly following the cylinder in its rotation after the apron drops, I employ a guide or dropper, (shown at $r$,) which is hinged at its ends $r'$ to the cylinder, and shuts up into grooves in the cylinder, as indicated by dotted lines in Fig. 4. This dropper is so located that, when the apron descends, the dropper will tend to turn on its hinges, so as to drop out from the cylinder, carrying down with it, by its weight, the sheets which have been wrapped over it on the cylinder. The dropper is then at once raised in the following manner: Playing through the side of one of the cylinder-heads is a pin, $s$, located opposite an annular groove in the contiguous face of the cylinder. This pin, so long as the apron is raised, is retracted by a spring, $s'$, indicated by dotted lines in Fig. 6. As soon, however, as the cylinder-head turns and the apron drops, the projecting head of the pin, following the movement of the cylinder-head, is brought in contact with a cam-plate, *t*, fixed on frame A, by which it is forced inward, so that the inner end of the pin will project into the said annular groove. The hinged dropper *r* is provided at one of its hinged ends with a finger, *v*, which is arranged in the groove, and so placed that when the dropper falls it will lie transversely across the groove and in the path of the pin. The position of the parts at this time is shown in Fig. 7, the pin being so located as to be but a short distance in advance of the fingers. The continued rotation of the cylinder soon brings this finger in contact with the pin, and the dropper is thereby forced up in place instantly and with a snap, so that it will be folded up out of the way before arriving at the upper stationary guide-fingers, from which the succeeding sheet now passes and envelopes both cylinder and hinged dropper. When the machine is about to be used the cylinder should be so turned that, as the sheet begins to pass it from the guides and tapes, the free end of the hinged dropper will be somewhat behind the front end of the sheet.

I have described what I consider to be the best means for giving effect to my invention; but I do not confine myself to the precise detail herein described, as it is manifest that the same may be varied without departure from my invention.

What I claim, and desire to secure by Letters Patent, is—

1. The method of delivering sheets of paper by accumulating a number laid one upon the other successively on a revolving endless carrier, and then discharging them in a single mass therefrom.

2. The gathering-cylinder or revolving endless carrier, combined with means for directing and retaining many sheets thereon, and means for stripping the accumulated sheets therefrom, all substantially as described.

3. The combination of devices for separating the paper into sheets, with a gathering-cylinder or revolving endless carrier, devices for directing and retaining many sheets thereon, and means for delivering the accumulated sheets in a single mass therefrom, all substantially as described.

4. The combination of a mechanism for printing a web of paper, with a mechanism for severing said web into sheets, a gathering-cylinder or revolving endless carrier, devices for directing and retaining many sheets thereon, and means for delivering the accumulated sheets in a single mass therefrom, all substantially as described.

5. The combination, with the delivery-cylinder, of a dropping or delivery apron, formed by the tapes which run in contact with the cylinder, and automatically operated alternately to rise and embrace the cylinder and cause the sheets to accumulate thereon in layers, and to drop and permit the discharge of the said sheets, substantially as and for the purposes set forth.

6. The delivery-cylinder and independent cylinder-heads, mounted on the axis of said cylinder, in combination with the endless tapes, and the movable or dropping frame or arms carrying one or more of the pulley-shafts for the tapes, and hinged or jointed to the cylinder-heads, the whole operating as set forth.

7. The combination, with the cylinder-heads and dropping-frame, of the coiled springs for producing the rotation of the heads needed to effect the dropping of the frame, and the retaining-hooks for holding the said heads in position against the pressure of the springs, as and for the purposes set forth.

8. In combination with the revolving cylinder, the cylinder-heads and their actuating springs, the lugs and dogs carried by said cylinder and cylinder-heads, respectively, and adapted to engage with and disengage from one another at the time and in the manner set forth, and the retaining-hooks adapted to catch and hold the cylinder-heads upon disengagement of said lugs and dogs, the whole operating together, as and for the purposes set forth.

9. The combination, with the cylinder-heads and their retaining-hooks, of the tripping-lever and register-wheel, and pin carried by said register-wheel, substantially as shown and set forth.

10. In combination with the dropping-apron and delivery-cylinder, the hinged dropper or guide carried by said cylinder, and operating, in connection with the same and the dropping-apron, substantially as set forth.

11. The dropper, hinged to and carried by the delivery-cylinder, in combination with the lifting-pin in the cylinder-head, adapted to engage a finger on said dropper at the time and in the manner set forth, said parts being combined for joint operation, substantially as shown and described.

12. In combination with the dropping-apron or frame and the delivery-cylinder, the bent guide-fingers carried by said dropping-apron, and operating in connection with the delivery-cylinder, substantially in the manner shown and set forth.

In testimony whereof I have hereunto signed my name this 5th day of March, A. D. 1877, in the presence of two subscribing witnesses.

THOS. J. MAYALL.

Witnesses:
THE. BAILEY,
A. POLLOK.